Patented Oct. 21, 1941

2,259,482

UNITED STATES PATENT OFFICE 2,259,482

METHOD OF TREATING PIGMENTS AND PRODUCTS PRODUCED THEREBY

Kenneth S. Mowlds, Baltimore, Md., assignor to The Glidden Company, Cleveland, Ohio, a corporation of Ohio No Drawing. Application April 24, 1939, Serial No. 269,786

22 Claims. (Cl. 106—295)

The present invention relates to pigments, and particularly relates to pigments of improved hiding power. More specifically the present invention relates to an improvement on the invention described in Serial No. 175,246, filed November 18, 1937.

In said application Serial No. 175,246 there is disclosed a process of treating pigments whereby their hiding power is greatly improved. By this process a pigment is produced containing the reaction product of a water soluble silicate and an acid or salt capable of precipitating the silicate in insoluble form. Among the precipitating agents which may be used are water soluble salts of aluminum, alkaline earth metals, and acids such as sulfuric acid or other mineral acid.

It has been found preferable in practice to use a salt such as an alkaline earth salt to effect the precipitation of the silicate. However, the use of salts as precipitating agents results in certain disadvantages when the treated pigments are used in paints or similar dispersions. One of the disadvantages is that the pigments so treated have an increased tendency to settling. Another is that in the case of a sulfide pigment containing the reaction product of the soluble silicate and a precipitating salt, the pigment is discolored when used with metallic driers such as lead driers, unless some special treatment is given the silicated pigment.

The present invention contemplates a procedure whereby the advantages of using salts for the precipitation of the soluble silicate are obtained but without the disadvantages ordinarily resulting from their use.

It has been found that if the soluble silicate is first converted to silicic acid, and the silicic acid then treated with oxides or hydroxides of alkaline earth metals, zinc, aluminum, or their equivalents that improved results are obtained.

According to a preferred method a soluble silicate such as sodium silicate is mixed with an aqueous slurry of the pigment being treated. An amount of acid, such as sulfuric or hydrochloric, equivalent to the Na₂O in the sodium silicate is then added with the formation of silicic acid. While the acid is capable of precipitating the silicate under the proper conditions, as understood by those skilled in the art, such precipitation is not necessary in the present invention and ordinarily will not take place. After the addition of the acid and the formation of silicic acid, an amount of oxide or hydroxide of alkaline earth metals, zinc, aluminum or equivalent, equivalent to the Na₂O or other alkali metal oxide present in the original soluble silicate is added.

The advantages resulting from the present invention are believed to be due in part at least to the freedom of the treated pigment from salts of alkaline earth metals, zinc, aluminum, etc. Upon the addition of the acid to the slurry containing the soluble silicate the pigment dispersion is increased. The alkali metal salt may be removed later, and its removal is much more easily effected than are the alkaline earth or other precipitating salts when they are used. It appears that when the soluble alkali metal silicate is precipitated directly by the precipitating salts that some of this precipitating salt is occluded, and when present in the pigment cause increased settling and discoloration in paints, etc. This discoloration is particularly noticeable in the case of sulfide pigments, such as lithopone, or other zinc sulfide pigments, cadmium sulfide pigments, etc. when they are used in paints containing metallic driers, such as lead driers. It is believed that the occluded precipitating salts cause the formation of lead or other colored sulfides.

By employing the procedure of the present invention this occlusion of precipitating salt and its effects are overcome.

The invention is applicable to the treatment of pigments generally and is particularly applicable to the treatment of white pigments such as lithopone, TiO₂, etc. and inerts such as calcium carbonate, blanc fixe, calcium sulfate, etc. or mixtures thereof. In treating the pigments the amount of silicate may vary, and depends upon various factors. Ordinarily, however, the amount will be from about 0.5% to 10% by weight of the pigment treated. These amounts, however, are not exact, as more or less may be used. Ordinarily not much less will be used as in most cases the benefits obtained would not justify the treatment. If desired, more than 10% may be used which may be as much as 20% or more.

The following example is illustrative of the invention:

1000 grams of lithopone are slurried in water, and 204 cc. of a 40° Baumé sodium silicate solution containing .1162 gram of Na₂O per cc. is added. After agitation sufficient hydrochloric acid is added to convert the silicate into silicic acid. To this mixture is then added 90 grams of CaO. After agitation and the precipitation is complete the pigment is filtered, washed, dried and ground to produce a finished pigment. This pigment when used in a paint formula containing a lead drier showed no greater discoloration than an untreated pigment, whereas a lithopone given a silicate treatment employing CaCl₂ as a precipitating agent, and not given any special treatment to overcome discoloration, showed a marked discoloration in the same paint formula. Also the pigment produced did not settle as badly in the paint formulation as did the pigment in which precipitation was carried out by CaCl₂.

It will be readily appreciated that, if desired, silicic acid may be added directly to the pigment slurry, and this then converted by the addition of a sufficient amount of oxide or hydroxide to form the insoluble silicate with the silicic acid.

Also the insoluble silicate may be separately prepared and then mixed with the base pigment. In such a case the improvement in hiding power is not as great as where the precipitation is made with the pigment present, although there is a marked increase in hiding power in either case.

Having described my invention what is claimed is:

1. The process of improving the hiding power of base pigments which comprises treating silicic acid with a metallic insolubilizing and precipitating agent therefor selected from the class consisting of oxides and hydroxides of alkaline earth metals, zinc and aluminum to convert the silicic acid into the corresponding insoluble metallic silicate, and mixing the resulting insoluble silicate with a base pigment.

2. The process of improving the hiding power of base pigments which comprises treating silicic acid with a metallic insolubilizing and precipitating agent therefor selected from the class consisting of oxides and hydroxides of alkaline earth metals, zinc and aluminum to convert the silicic acid into the corresponding insoluble metallic silicate, while in admixture with a base pigment.

3. The process of improving the hiding power of base pigments which comprises converting an aqueous metal silicate into silicic acid by means of an acid, precipitating the silicic acid with a precipitant therefor selected from the class consisting of oxides and hydroxides of alkaline earth metals, zinc and aluminum to convert the silicic acid into the corresponding insoluble metallic silicate, while in admixture with a base pigment.

4. The process of improving the hiding power of base pigments which comprises converting an aqueous alkali metal silicate into silicic acid, and precipitating the silicic acid with a precipitant therefor selected from the class consisting of oxides and hydroxides of alkaline earth metals, zinc and aluminum to convert the silicic acid into the corresponding insoluble metallic silicate, all in the presence of a base pigment.

5. The process of improving the hiding power of base pigments which comprises providing an aqueous slurry of a base pigment, introducing a soluble silicate into said slurry, adding an acid to convert the soluble silicate to silicic acid, and thereafter adding a metallic precipitating agent for the silicic acid selected from the class consisting of oxides and hydroxides of a metal capable of forming an insoluble metal silicate with the silicic acid.

6. The process of improving the hiding power of base pigments which comprises providing an aqueous slurry of a base pigment, introducing a soluble silicate into said slurry, adding an acid to convert the soluble silicate into silicic acid and thereafter adding a metallic containing precipitant for the silicic acid, selected from the class consisting of oxides and hydroxides of alkaline earth metals, zinc and aluminum to convert the silicic acid into the corresponding insoluble metallic silicate.

7. The process of claim 6 in which the metal radical of the precipitant is an alkaline earth metal radical.

8. The process of improving the hiding power of a sulfide pigment which comprises providing an aqueous solution containing a sulfide pigment, introducing a soluble silicate into said slurry, introducing an acid to convert the soluble silicate into silicic acid, and thereafter treating the silicic acid with alkaline earth oxides and hydroxides.

9. The process of claim 8 in which the sulfide pigment is a zinc sulfide pigment.

10. The process of claim 8 in which the sulfide pigment is lithopone.

11. The process of improving the hiding power of base pigments which comprises providing an aqueous slurry of a base pigment, introducing an alkali metal silicate into said slurry, adding sufficient acid to convert the alkali metal silicate into silicic acid, and thereafter adding an amount of an alkaline earth metal oxide stoichiometrically equivalent to the alkali metal oxide present in the original alkali metal silicate, whereby the silicic acid is converted into an insoluble alkaline earth metal silicate.

12. The process of improving the hiding power of base pigments which comprises providing an aqueous slurry of a base pigment, introducing approximately 0.5% to 10% by weight of the pigment, of an alkali metal silicate, adding sufficient acid to convert the alkali metal silicate into silicic acid, and thereafter adding an amount of an alkaline earth metal oxide stoichiometrically equivalent to the alkali metal oxide present in the original alkali metal silicate whereby the silicic acid is converted into an insoluble alkaline earth metal silicate.

13. The process of claim 12 in which the pigment comprises a sulfide pigment.

14. The process of claim 12 in which the pigment comprises a zinc sulfide pigment.

15. The process of claim 12 in which the pigment comprises lithopone.

16. The process of improving the hiding power of lithopone which comprises providing an aqueous slurry of lithopone, introducing approximately 0.5% to 10% by weight of the lithopone of sodium silicate, adding sufficient acid to convert the sodium silicate into silicic acid, and thereafter adding a metal containing precipitant and insolubilizing agent for the silicic acid selected from the class consisting of oxides and hydroxides of alkaline earth metals, zinc and aluminum to convert the silicic acid into the corresponding insoluble metallic silicate, the amount of said precipitant being stoichiometrically equivalent to the Na₂O content of the sodium silicate.

17. The process of claim 16 in which the metal radical of the precipitating agent is an alkaline earth metal radical.

18. The process of claim 16 in which the precipitating agent is calcium oxide.

19. The process of claim 11 in which the base pigment comprises titanium dioxide pigment.

20. The process of claim 11 in which the base pigment comprises a mixture of a white pigment selected from the class consisting of lithopone and titanium dioxide, and an inert pigment.

21. The process of improving the hiding power of base pigments which comprises mixing a base pigment with an insoluble silicate produced by treating silicic acid with a metallic insolubilizing and precipitating agent therefor selected from the class consisting of oxides and hydroxides of alkaline earth metals, zinc, and aluminum to convert the silicic acid into the corresponding insoluble metallic silicate.

22. The process of improving the hiding power of base pigments which comprises treating silicic acid with a metallic precipitating agent therefor selected from the class consisting of oxides and hydroxides of a metal capable of forming an insoluble silicate with the silicic acid, and mixing the resulting insoluble silicate with the base pigment.

KENNETH S. MOWLDS.